Patented Sept. 28, 1954

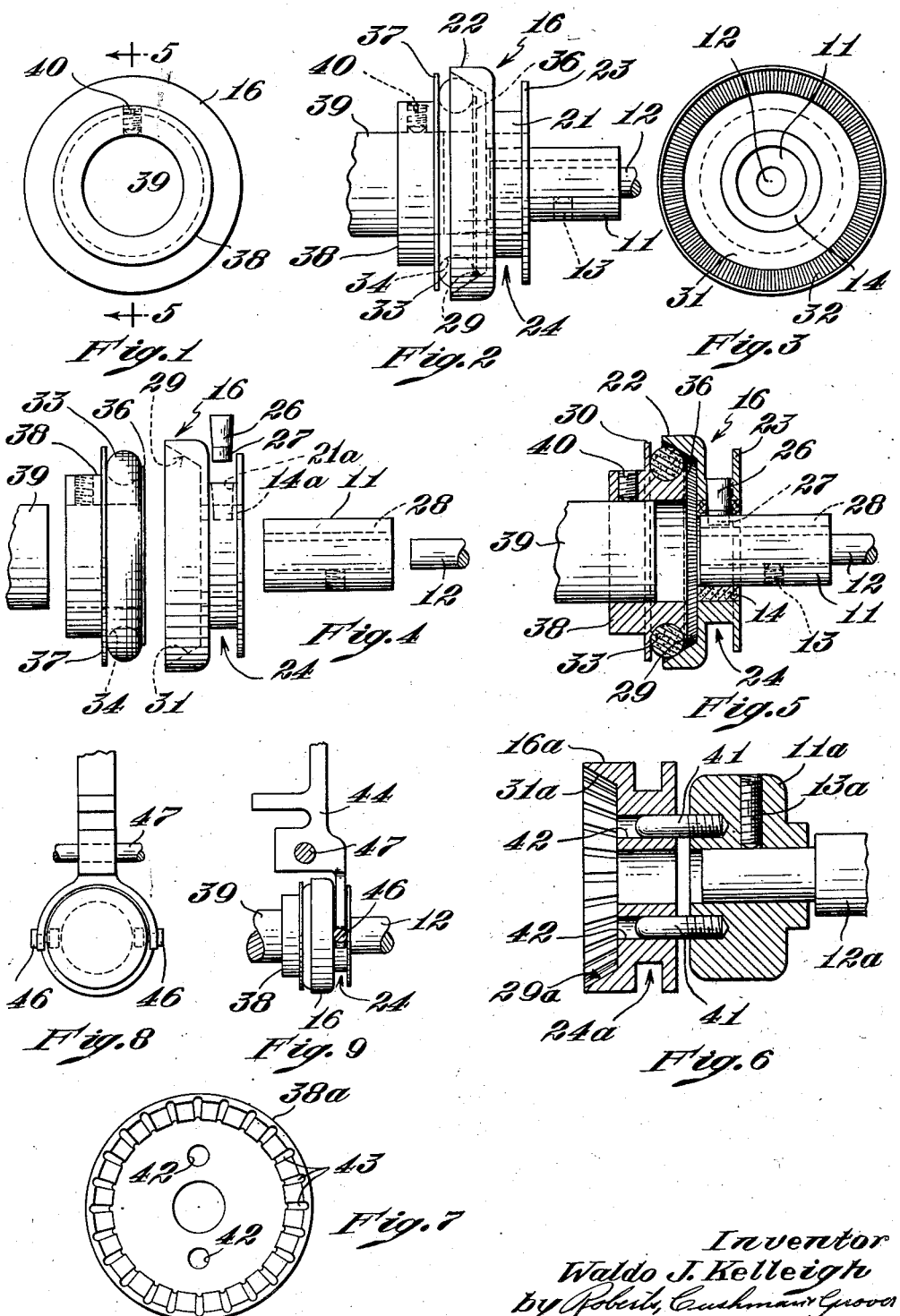

2,690,246

UNITED STATES PATENT OFFICE 2,690,246

CLUTCH

Waldo J. Kelleigh, Wayland, Mass., assignor to General Control Company, Boston, Mass., a corporation of Massachusetts Application June 29, 1949, Serial No. 102,090

5 Claims. (Cl. 192—66)

In certain types of apparatus employing mechanical clutches it is desirable to avoid insofar as possible any inaccuracies of engagement. Devices of this type are, for example, timers such as represented by the electrical timer described in my copending application Serial No. 72,118, filed January 22, 1949, now Patent No. 2,542,085. In this timer a mechanical clutch is used for selectively coupling the timing elements with a synchronous motor which is maintained in continuous operation. Clutches having positive drive such as those with interengaging teeth are preferred for this service because they avoid the altogether uncontrollable timing error introduced by any slippage of conventional friction clutches. Although toothed clutches provide a positive drive and limit the error to the tooth pitch, these clutches are not sufficiently exact for all purposes since, unless the teeth upon the driving member are in exact alignment with the spaces between the teeth upon the driven member there is relative angular movement between the members as the teeth are brought into mesh. In long interval timers, for example of the above mentioned type, the indeterminable error so introduced may be appreciable, being particularly troublesome as neither the period nor trend thereof is predictable.

Objects of this invention are to provide a clutch which transmits torque without slipping, which engages essentially instantaneously at any relative position between its driving and driven members, which is simple in operation, which is economical in construction, which has a long life, which requires a minimum of maintenance, and which advances the art generally.

In a broad aspect the invention contemplates a clutch having driving and driven members with associated means for moving the members relatively to each other whereby indentations or serrations upon a surface of one of the members are brought into contact with a yieldable portion of the other member. The yieldable portion is made of a material such as synthetic rubber which withstands abrasion practically indefinitely and can be deformed sufficiently to be indented by and to project into the indentations of the first member, while reassuming its normal shape upon disengagement.

In another aspect the driven member carries a ring or torus of yieldable material which engages serrations in an inner conically shaped face of the driving member. As the torus is deformed by the engagement of the clutch, segments thereof are forced into the notches between the serrations in effect to form a series of teeth insuring nonslipping between the driving and driven members. As the segments are formed by the engagement of the driving members it will be apparent that there is no relative angular movement introduced therebetween.

In still another aspect of the invention the driven member and a fixed driving member are secured to respective axially aligned shafts. A movable driving member having a serrated or otherwise indented surface is connected with the fixed driving member so that there is no relative rotation therebetween but the movable member can be axially translated by a fork or otherwise with respect to the fixed driving member to bring the serrated face into contact with the yieldable torus or ring carried by the driven member. Such connection may be made by one or more pins arranged parallel to the axis of the coupled shafts which pins are secured to the fixed member at one end, with their other ends slidably engaging the movable member; or the movable member may be slidably mounted upon the outer surface of a fixed member relative rotation therebetween being prevented by a radially disposed pin which is secured in one of the driving members and engages an elongated keyway in the other member.

These and other objects, aspects and features will be apparent from the following description of an illustrative specific embodiment of the invention referring to drawings in which Fig. 1 is an end elevation view of one embodiment of the invention;

Fig. 2 is a side elevation view of the embodiment shown in Fig. 1;

Fig. 3 is an end view of the contacting face of the driving member showing the serrations therein;

Fig. 4 is an exploded view of the embodiment shown in Fig. 1;

Fig. 5 is a sectional view on line 5—5 of Fig. 1;

Fig. 6 is an axial sectional view of a second embodiment of the invention;

Fig. 7 is an end view of the contacting face of the driving member of the embodiment shown in Fig. 6;

Fig. 8 is an end elevation view of the fork for moving the driving member into engagement; and Fig. 9 is a side elevation view of the fork shown in Fig. 8.

In the embodiment of the invention chosen for the purpose of illustration the clutch shown in Fig. 1, comprises a fixed driving member such as the sleeve 11 which is secured to a driving shaft 12 by means of a set screw 13. Mounted circumjacent the sleeve 11 is a bushing 14 (Fig. 5) pressed into a movable driving member 16. The bushing 14 is preferably of sintered metal impregnated with oil thereby providing practically permanent lubrication to reduce friction as the member 16 is axially moved with respect to the sleeve 11 as will be described in detail hereinafter.

The movable driving member 16 comprises a connecting hub 21 having formed integrally therewith at its opposite ends an enlarged disc portion 22 and a flange 23 respectively. The diameters of the disc 22 and the flange 23 are considerably greater than the diameter of the hub 21 thereby defining a circumferential groove 24 for accommodating the clutch engaging mechanism described below. Relative rotational movement between the driving members 11 and 16 is prevented by a tapered pin 26 (Fig. 5) pressed into an aperture 21a in the hub 21 and extending through an aperture 14a of bushing 14, so that the cylindrical end 27 thereof engages a keyway 28 cut axially into the periphery of the sleeve 11. This keyway 28 permits relative axial movement between the driving members 11 and 16.

The end of the disc 22 has a tapered recess 29 the conical surface 31 of which has a plurality of radially extending serrations 32. With the clutch in the engaged position, the serrated conical surface 31 is in contact with the outer periphery of a unitary body of yieldable material which body has a continuous surface for direct engagement with indentations such as serrations 32. In the present embodiment, this body is a torus 33 of yieldable material such as a so-called "O" ring having physical characteristics comparable to those required for "Class B—High Flexibility" hydraulic packings as required by the "Army-Navy Aeronautical Specification Packings and Gaskets; Hydraulic, AN–P–79," dated August 9, 1945. Rings of such material are extraordinarily resistant to wear, extrusion, permanent set, fatigue, cracking and disintegration. The ring 33 is carried in a groove 34 between two flanges 36 and 37 radially projecting from a driven member 38. The groove 34 has a substantially semi-circular contour and is so proportioned that the ring 33 is slightly distorted when it is slipped in place over the flange 36. The driven member 38 is secured to a driven shaft 39 by means of a set screw 40.

In Fig. 6 is shown another embodiment of the driving members. The fixed driving member 11a is secured to a driving shaft 12a by means of a set screw 13a. Two pins 41 project from the face of the member 11a, the threaded ends thereof engaging threads in oppositely disposed apertures respectively. The opposite ends of the pins slidingly engage respective apertures 42 in a movable driving member 16a which has a circumferentially disposed groove 24a similar to the groove 24 and a tapered recess 29a. The conical surface 31a has a series of indentations 43 (Fig. 7) radially arranged for engaging the synthetic rubber ring. The ring and driven member used with this embodiment are similar to the corresponding parts 33 and 38 described in detail in connection with the first embodiment.

The movable driving member 16 (or 16a) is moved relatively to the driven member 38 to bring the conical surface 31 (or 31a) into contact with the ring 33 by means of a bifurcated member such as the lever 44 shown in Figs. 8 and 9 which is similar to the clutch lever 43 in my copending application Serial No. 72,118. Projecting into the groove 24 from the respective bifurcated lever ends respectively are two pins such as the screws 46 whereby clockwise rotation of the lever 44 about a suspending shaft 47 moves the driving member to bring the face 32 into contact with the ring 33. The material of the ring 33 is sufficiently yieldable so that it deforms sufficiently to enter the indentations 32 upon the face in effect forming teeth which prevent relative slippage between the driving and driven members. On the other hand I have found that material of the type used in the above identified "O" rings withstands the successive deformation and reformation for an indefinite time so as to be capable of continuously providing teeth at any given point defined by the permanently toothed member, which temporary teeth are eliminated upon every engagement to make the resilient member ready for the next tooth formation. It will be evident that the above described construction combines the advantages of a smooth face clutch with those of a tooth clutch, that is the engagement of the members does not introduce relative angular movement therebetween while it provides the positive drive of a clutch having two toothed members.

It should be understood that the present disclosure is for the purpose of illustration only and that this invention includes all modifications and equivalents which fall within the scope of the appended claims.

I claim:

1. A clutch comprising a rotatable driving member having an internal conical surface with a plurality of serrations which intersect circles described by points on the said conical surface of the driving member, a driven member carrying a unitary body of yieldable material having a torical surface for engaging the said serrations, and means for translating the members relatively to each other to bring the said torical surface into engagement with said serrations thereby preventing relative rotation between said members.

2. A clutch comprising a rotatable driving member having an internal conical surface with a plurality of serrations which intersect circles described by points on the said conical surface of the driving member, a driven member carrying a unitary body of yieldable material having a torical surface for selectively engaging the said serrations, and a pivotally suspended fork having a bifurcated end for axially moving the driving member towards the driven member to bring the said serrations into engagement with the said torical surface thereby preventing relative rotation between said members.

3. A clutch for transmitting torque between two shafts comprising a fixed driving member secured to one of said shafts, a movable driving member having a contacting surface with a plurality of indentations therein, a driven member secured to one of said shafts and carrying a unitary body of yieldable material which body has a continuous surface arranged for directly engaging the indentations, a pin attached to one of said driving members and slidably engaging the other of said driving members, and means for translating the moving driving member relatively to the fixed driving member to bring the indentations into engagement with said surface thereby preventing relative rotation between said driving and driven members.

4. A clutch for transmitting torque between two shafts comprising a driven member secured to one of said shafts and having a contacting portion of yieldable material, a fixed driving member secured to one of said shafts, a movable driving member having a contacting surface with a plurality of indentations therein, a radially disposed pin attached to said movable driven member and slidably engaging the fixed driving member, and means for translating the movable driving member relatively to the fixed driving member to bring the indentations into engagement with the yieldable portion of the driven member thereby preventing relative rotation between said driving and driven members.

5. A clutch for transmitting torque between two shafts comprising a driven member secured to one of said shafts and having a contacting portion of yieldable material, a fixed driving member secured to one of said shafts, a movable driving member having a contacting surface with a plurality of indentations therein, two opposed pins axially projecting from the fixed driving member and slidably engaging the movable driving member, and means for translating the movable driving member relatively to the fixed driving member to bring the indentations into engagement with the yieldable portion of the driven member thereby preventing relative rotation between said driving and driven members.

References Cited in the file of this patent

UNITED STATES PATENTS

| Number | Name | Date |
|---|---|---|
| 981,345 | Winter | Jan. 10, 1911 |
| 1,491,267 | Joffe et al. | Apr. 22, 1924 |
| 1,777,829 | Edgecumbe | Oct. 7, 1930 |
| 2,416,083 | Battaline | Feb. 18, 1947 |
| 2,481,028 | Lear | Sept. 6, 1949 |

FOREIGN PATENTS

| Number | Country | Date |
|---|---|---|
| 237,460 | Switzerland | Aug. 16, 1947 |
| 403,745 | Great Britain | Jan. 4, 1933 |